United States Patent [19]

Coughlin et al.

[11] 4,014,292
[45] Mar. 29, 1977

[54] COLLAPSIBLE AND DISPOSABLE SANITARY PET LITTER CONTAINER

[76] Inventors: Warren J. Coughlin, 600 Old Stamford Road, New Canaan, Conn. 06840; Renato D. Fecci, 587 High Ridge Road, Stamford, Conn. 06905

[22] Filed: May 7, 1976

[21] Appl. No.: 684,155

[52] U.S. Cl. .................................. 119/1; 229/41 R; 229/37 R; 206/509; 220/6
[51] Int. Cl.² .......................................... B65D 5/08
[58] Field of Search ............ 229/37, 4 R, 30, 17 G; 206/503, 509; 220/6; 119/1

[56] References Cited
UNITED STATES PATENTS

| | | | |
|---|---|---|---|
| 810,574 | 1/1906 | Sewell | 229/41 R |
| 846,788 | 3/1907 | Friedheim | 229/41 R |
| 3,217,967 | 11/1965 | Jackson | 229/17 G |
| 3,233,263 | 5/1967 | Gulliver | 229/37 R X |
| 3,365,070 | 1/1968 | Miles | 206/509 X |
| 3,376,994 | 4/1968 | Flinn, Jr. | 220/6 |
| 3,581,977 | 6/1971 | Kirsky | 229/37 R |

*Primary Examiner*—Davis T. Moorhead
*Attorney, Agent, or Firm*—St. Onge Mayers Steward & Reens

[57] ABSTRACT

A sanitary pet litter container comprises a carton of sheet material which may be folded into a wedge-shaped configuration for storage or disposal or which may be opened to receive pets. The carton has a bottom and opposing end walls that are foldable inwardly toward each other on mutually parallel end fold lines which are spaced from and parallel to the bottom. Two opposing side walls are joined to the end walls at four corners. Each side wall has a central portion which is foldable inwardly toward the other side wall central portion on a lateral side fold line parallel to the other lateral side fold line but not parallel to the bottom. Further, each side wall has two wing portions each of which is foldable outwardly against the central portion on one fold line corresponding to one corner and on an acute side fold line. Each of these acute side fold lines originates at the intersection of the one corner with a lateral side fold line and bisects the angle defined by the intersection.

7 Claims, 5 Drawing Figures

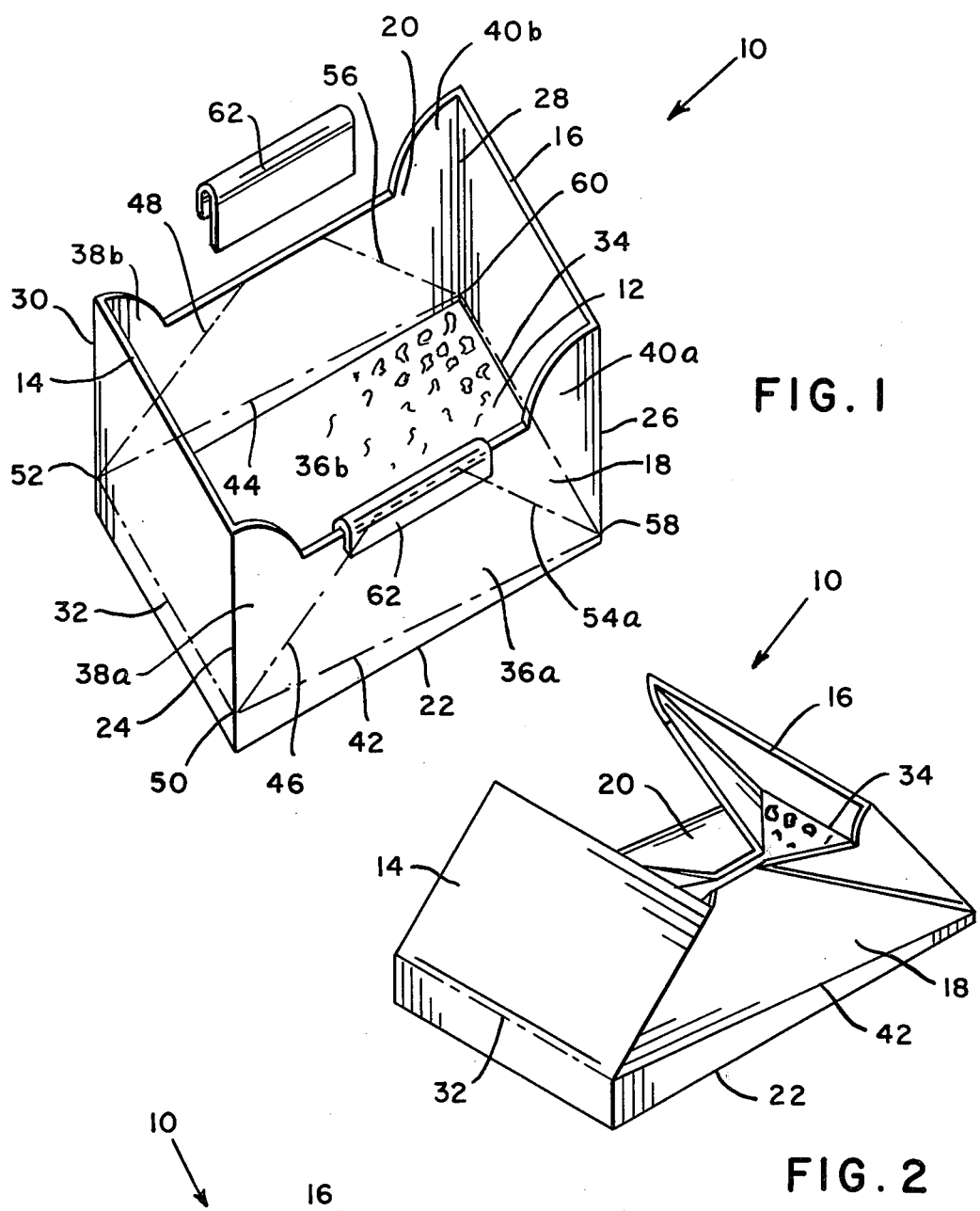

COLLAPSIBLE AND DISPOSABLE SANITARY PET LITTER CONTAINER

BACKGROUND OF THE INVENTION

1. Field of the Invention

The present invention relates to a collapsible and disposable container which, when folded, has a compact wedge-shaped configuration yet when unfolded provides a receptacle having side and end walls which are relatively high compared to the length and width of the container bottom. More specifically, the invention relates to a container which may be used as a sanitary pet litter station and provides a confined area accessable to pets that holds pet litter absorbent material.

Today, many people keep pets, such as cats and dogs, for personal enjoyment and companionship. However, one objectional aspect of taking proper care of pets, particularly when the pet's access to the out-of-doors is limited, is providing sanitary toilet or litter facilities for them. In order to prevent unpleasant odors or unhealthy conditions from developing in litter facilities which are kept in, for example, a house, apartment, or hotel room, the facilities must be frequently cleaned.

2. Description of the Prior Art

In the past, pet owners have used newspapers, ground clay, and sand confined in a separate tray, box, or pan as a litter facility even though cleaning was inconvenient.

More recently, proposals have been made for self-contained, completely disposable packages which include not only litter absorbent material but also a confining container. Such packages are disclosed, for example, in U.S. Pat. Nos. 3,154,052 (Sweeney); 3,170,618 (Sweeney); 3,227,137 (Goldman et al.); 3,581,975 (Riccio); and 3,684,155 (Smith).

Another pet litter container, sold under the trademark "Kitty Karton" by Scientific Pet, Cleveland, Ohio, includes a rectancular box-board container scored to fold into a flat configuration having a shallow rectangular cross-section or side or end elevation. All side walls of the unfolded container are of equal height. The folded container is sealed by a strip of tape to hold litter material therein.

SUMMARY OF THE INVENTION

In a preferred embodiment, to be described below in detail, the container of the present invention for pet litter has both open and closed positions. In the open position, the container is rectangular having high end walls and lower side walls. Accordingly, pets are less able to scratch pet litter material out of the container yet they may easily enter the container over the tops of the side walls. When folded, the container is wedge-shaped to permit easy storage and disposal.

In the preferred embodiment, the container of the present invention includes a carton which has a bottom and opposing end walls that are foldable inwardly toward each other on mutually parallel end fold lines which are also spaced from and parallel to the bottom. Two opposing side walls are joined to the end walls at four corners and are also joined to the bottom. Each side wall has a central portion which is foldable inwardly toward the other side wall central portion on a lateral side fold line that is parallel to the other lateral side fold line but not parallel to the bottom. The wedge-shaped folded configuration of the container results from the particular attitude of the lateral side fold lines.

Further, each side wall has two wing portions, each of which is foldable outwardly against the central portion on one fold line corresponding to one corner and on a second acute side fold line which originates at the intersection of the one corner with the lateral side fold line and bisects the angle defined by the intersection.

One end wall and the side wall wing portions attached to it are adapted to form an elongated aperture or slot which receives the opposing end wall when the carton is folded. Thus, the carton is self-sealing when in the folded configuration. Further, the wedge-shape of this folded configuration fosters easy storage and packaging of the litter container for distribution as well as easy disposal once the container has been used.

Accordingly, it is an object of the present invention to provide a sanitary, collapsible pet litter container which may be easily stored and distributed and further which may be easily disposed after use. The container and litter are self-contained and are designed to prevent pets from scratching litter material from the container interior.

Other objects, aspects, and advantages of the present invention will be pointed out in, or will be understood from the following detailed description provided below in conjunction with the accompanying drawings.

BRIEF DESCRIPTION OF THE DRAWINGS

FIG. 1 is a perspective view of the sanitary pet litter container constructed in accordance with the present invention and shown in its open position.

FIG. 2 is a perspective view of this pet litter container shown partially folded toward its closed, wedge-shaped position.

FIG. 3 is a perspective view of the pet litter container shown completely closed to its wedge-shaped configuration.

DETAILED DESCRIPTION OF THE PREFERRED EMBODIMENTS

Figure 4:
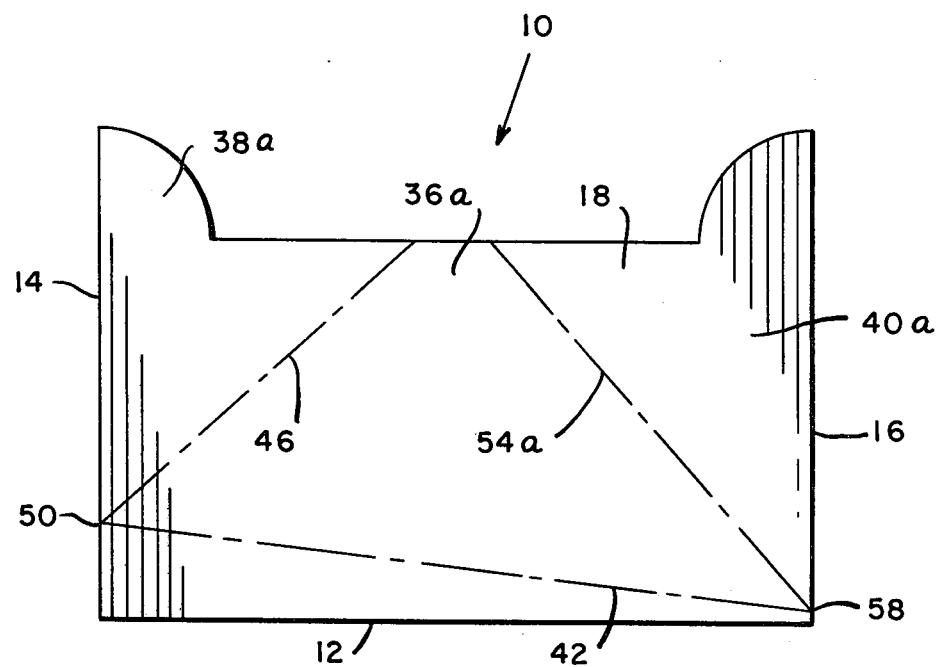
FIG. 4 is a side elevational view of the pet litter container showing the relationship of the various side wall fold lines.

FIG. 1 illustrates the pet litter container of the present invention in its open position ready to receive a pet. This container comprises a carton, generally indicated at 10, which may be made of any lightweight sheet material. However, it has been found that corrugated boxboard is satisfactory in that it is economical, lightweight, and sturdy.

The carton is formed with a rectangular bottom 12, two end walls 14 and 16, and two side walls 18 and 20. The end and side walls are joined to the bottom at a peripheral bottom edge 22 and are joined to each other at four corners 24, 26, 28, and 30.

End walls 14 and 16 are each scored or pressed with end fold lines 32 and 34, respectively, which are parallel to each other as well as to the plane of the carton bottom 12. Thus, each end wall may be folded inwardly over the bottom as shown in FIGS. 2 and 3.

The side walls 18 and 20 are also scored or pressed to fold in a special manner to permit the carton to collapse to its wedge-shaped configuration as shown in FIG. 3. In particular, wide wall 18 has a central portion 36a and two wing portions 38a and 40a joined thereto.

Side wall 20, which is the mirror image of side wall 18, similarly has a central portion 36b and wing portions 38b and 40b. Each side wall 18 and 20 is scored or pressed on a lateral side wall fold line 42 and 44 respectively, which form the bottom margins of each side wall central portion 36, to be folded inwardly over the bottom 12. The lateral side fold lines are parallel to each other but, as can be seen in detail in FIG. 4, are not parallel to the bottom. Instead, they make a relatively small acute angle with the bottom to define the frustum of a wedge. Further, the lateral side fold lines and end fold lines form a single rectangularly shaped line that extends about the periphery of the carton.

The opposing side wing portions 38a and 38b are foldable outwardly against the central portions 36a and 36b respectively on first fold lines which correspond to the carton corners 24 and 30 and on side acute fold lines 46 and 48 which originate at intersections 50 and 52 of lateral side fold lines 40 and 44 with those corners. As can be seen in detail in FIG. 4, the acute side fold line 46 bisects the angle formed at intersection 50 by lateral side fold line 42 and corner 24. Similarly, the side acute fold line 48 bisects the angle formed at intersection 52 by lateral side fold line 44 and corner 30.

The opposing wings 40a and 40b are also adapted to fold outwardly against central portions 36a and 36b respectively on first fold lines corresponding to corners 26 and 28 and on acute side fold lines 54 and 56. These acute side fold lines bisect the angles formed at intersections 58 and 60 of corner 26 and lateral side fold line 42 and corner 28 and lateral fold line 44 respectively. The acute side fold lines form bisectors of the angles formed at the respective intersections to permit the end walls to fold flat down over the bottom without being placed in lateral tension or compression.

As can be seen in FIG. 1, stiffners in the form of J-shaped channels 62 are provided to embrace the top edge of each side wall 18 and 20 and bridge both the central and wing portions of the respective side walls. Accordingly, when the carton is opened, the side walls are held firmly in their vertical position to prevent collapse by pet use for other reasons.

As can be seen in FIG. 1, a major portion of each side wall is cut substantially lower than the major portion of the end walls. Therefore, pets have easy access into the litter container over the side walls. However, the end walls are high enough so that pet scratching in the container does not cause litter material to be thrown therefrom.

As illustrated in FIG. 3, one of the end walls, specifically end wall 16, and the adjacent connected wing portions 40a and 40b cooperate to define an elongate slot or aperture 64 which receives the top edge of the opposing end wall 18 when the carton 10 is folded. This interlocking end wall arrangement automatically seals the carton in the closed position for easy storage and disposal and resists accidental unfolding of the carton to prevent spillage of its contents.

Figure 5:
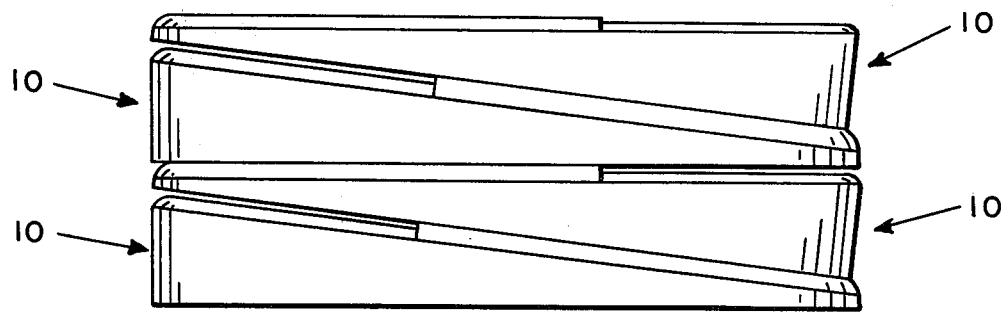
FIG. 5 is a side elevational view of two pet litter containers completely folded to their wedge-shaped configuration and stacked one on top of the other for shipment or storage.

FIG. 5 illustrates how multiple pet litter containers of the present invention may be stored one on top of the other to form a neat stack for shipping, storage and distribution.

It is desirable to provide the carton 10 with a waterproof lining or coating to retain pet litter therein. Further, absorbent granular pet litter material is packaged in the container in a plastic bag to be spread in the container bottom 12 when the carton is opened to its rectangular configuration shown in FIG. 1. The plastic bag, in which this granular material is packaged, may be saved as a disposal pouch in which the used pet litter container and granular material are placed when time for disposal comes.

It can be appreciated that the pet litter container of the present invention provides a convenient litter facility for pets which can be easily used by the pet and can be easily maintained by his owner.

Although a specific embodiment of the present invention has been described above in detail, it is to be understood that this is for purposes of illustration. Modifications may be made to the described pet litter container by those skilled in the art in order to adapt it to particular applications.

What is claimed is:
1. A collapsible and disposable sanitary pet litter container comprising:
a carton of sheet material having an open rectangular configuration for receiving pets and a closed wedge-shaped configuration for storage and disposal, said carton including
A. a bottom;
B. first and second end walls foldable inwardly toward each other over said bottom on mutually parallel end fold lines also parallel to said bottom; and
C. first and second side walls, each being joined to one end wall at two corners, and each having
1. a central portion which is foldable inwardly toward the other side wall central portion over said bottom on a lateral side fold line parallel to the other lateral side fold line but not parallel to said bottom, and
2. two wing portions, each being foldable outwardly against said central portion on one fold line corresponding to one corner and on an acute side fold line originating at the intersection of said one corner with said lateral side fold line and bisecting the angle defined by said intersection.

2. The collapsible and disposable sanitary pet litter container as claimed in claim 1 further comprising:
removable stiffening means for bridging said wing and central portions of said side walls to reinforce them when said carton is in its open rectangular configuration.

3. The collapsible and disposable sanitary pet litter container as claimed in claim 1 wherein said end fold lines and said lateral side fold lines form a single peripheral fold line about said carton.

4. The collapsible and disposable sanitary pet litter container as claimed in claim 1 wherein said side walls are wider than said end walls but wherein the major portion of said side walls is lower than the major portion of said end walls to prevent pet litter material from being scratched from said carton over the end walls and to permit pet access to said carton over said side walls.

5. The collapsible and disposable sanitary pet litter container as claimed in claim 1 wherein the top of one of said end walls and said adjacent side wall wing portions define an elongated aperture when said side and end walls are folded, the aperture being shaped and sized to receive the top of the other of said end walls in tight interfitting engagement which resists unfolding when said carton is in its wedge-shaped configuration.

6. The collapsible and disposable sanitary pet litter container as claimed in claim 1 further comprising a quantity of dry granular pet litter absorbent material packaged in said carton when in the wedge-shaped configuration to be distributed over said bottom when said carton is in the open configuration.

7. The collapsible and disposable sanitary pet litter container as claimed in claim 1 further comprising a waterproof liner for said carton.

* * * * *